United States Patent [19]
Guenthner

[11] 3,853,522
[45] Dec. 10, 1974

[54] METHOD AND APPARATUS OF CALIBRATING DRAWN GLASS TUBES

[75] Inventor: Franz Guenthner, Mainz-Mombach, Germany

[73] Assignee: JENAer Glaswerk Schott & Gen., Mainz, Germany

[22] Filed: June 15, 1973

[21] Appl. No.: 370,540

[30] Foreign Application Priority Data
June 15, 1972  Germany............................ 2229164

[52] U.S. Cl.......................... 65/87, 65/110, 65/280, 65/292
[51] Int. Cl. ...................... C03b 17/04, C03b 23/08
[58] Field of Search .......... 65/108, 86, 87, 89, 109, 65/110, 278, 276, 280, 292, 187

[56] References Cited
UNITED STATES PATENTS
3,190,739  6/1965  Wilson................................ 65/86 X
3,401,028  9/1968  Morrill, Jr........................... 65/87 X FOREIGN PATENTS OR APPLICATIONS
734,461  8/1955  Great Britain........................ 65/109

Primary Examiner—Arthur D. Kellogg
Attorney, Agent, or Firm—Littlepage, Quaintance, Murphy & Dobyns

[57] ABSTRACT

A method and apparatus for calibrating tubes, such as glass tubes, whilst these tubes are being drawn and, hence, are still in plastic condition. The invention consists in moving forming elements around the continuously drawn tube length and about axes which extend parallel to the drawing axis of the tube, the adjustable elements being so arranged that they can be moved towards or away from the tube being calibrated.

10 Claims, 5 Drawing Figures

PATENTED DEC 10 1974

METHOD AND APPARATUS OF CALIBRATING DRAWN GLASS TUBES

The invention relates to a method of calibrating tubes whilst they are being drawn. According to the invention a glass tube which is continuously drawn upwardly, downwardly or horizontally can be formed in the plastic zone by a number of shaping or forming rolls or other shaping or forming elements being moved around the tube length and shaping the length.

In one embodiment, the circle which circumscribes the shaping or forming rolls and which represents the external diameter of the glass tube to be calibrated is variable during the drawing or shaping operation by adjustment of the rolls. In this case, the shaping or drawing is effected by the tube length, on entering the rotating rolls, having a larger diameter and being compressed by the rolls, or a smaller diameter and being expanded by means of an externally applied reduced atmospheric pressure until it is limited by the rotating rolls.

The rolls and the structure or frame supporting them can be arranged immediately following the tool which forms or shapes the tube length or after a heating furnace which is arranged between the said tool and the frame. Instead of rolls, other shaping or forming elements can be used in such a way that they operate in the manner of a radially stressed segmental bearing, and in this case the tube length may be disposed at the position of the shaft of the segment bearing and is not rotated, while the shaping elements (segments) revolve and shape the tube length. A gas cushion between the tube length and the shaping or forming elements, which is formed either by rotation of the shaping or forming elements in the nature of a lubrication gap or by a gas which is permitted to discharge from that side of the segments facing the tube length, in this way prevents any possible damage to the tube length by the shaping or forming elements. The shaping or forming elements can also slide directly on the glass surface, when they consist of a material, e.g. carbon, which does not leave behind any traces of sliding.

Methods are known by means of which a tube length is formed or shaped during the drawing. For example, U.S. Pat. No. 3,190,739 describes a method by which the glass tube is drawn through correspondingly calibrated openings and in this case use is made of an excess pressure from inside and a reduced pressure from outside on the tube. However, this method has the disadvantage that fixed tools are used for the shaping operation, which means that the diameter cannot be changed during the drawing operation, with the additional disadvantage that the glass length slides along the shaping tool and as a result can be very easily damaged on its surface. In addition, a large number of tools are necessary in order to be able to produce a conventional assortment having many different diameters. Because of the necessary replacement of tools when changing over to another tube diameter, a large amount of production waste is produced. The aforementioned method does not have these disadvantages, since as shown in the drawing, it is possible to set any arbitrary diameters and the relative movement which is established between the glass or other material to be formed or shaped and the tool with a shaping tool rolling on the glass or other material surface produces much less or even no damage on the glass or other material surface.

According to the present invention there is provided a method of calibrating tubes, generally glass tubes, whilst they are being drawn, wherein a plurality, preferably three or more, of adjustable shaping or forming elements are moved around the continuously drawn tube length and about axes which extend parallel to the drawing axis of the tube, the adjustable elements being so arranged that they can be moved towards or away form the tube being calibrated so as to determine the required outer diameter of the tube. The shaping or forming elements may comprise elongated shaping rolls rotatable about their longitudinal axes; alternatively the shaping or forming elements used may be of the kind which are not rotated about their own axes. In one convenient method illustrative of the invention the tube length, on entering the region defined by the shaping or forming elements, has a diameter which is smaller than the intended diameter and is expanded by reducing the atmospheric pressure outside the tube length. A gas cushion may be formed between the shaping or forming elements and the tube surface.

By way of example preferred forms of the invention will now be described by reference to the accompanying drawings, wherein.

Figure 1:
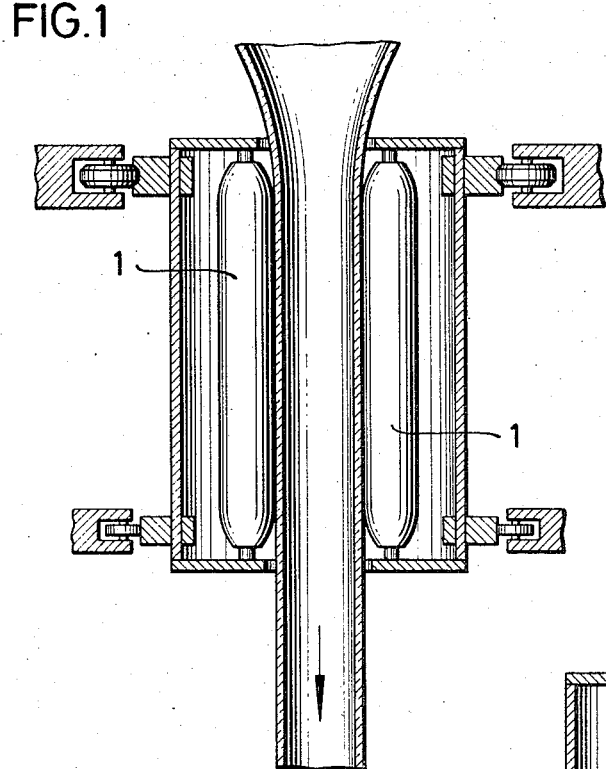
FIG. 1 shows in diagrammatic sectional elevation an arrangement of shaping or forming rolls when a glass tube length enters with a larger diameter and is compressed by the rolls to the final diameter required.
Figure 2:
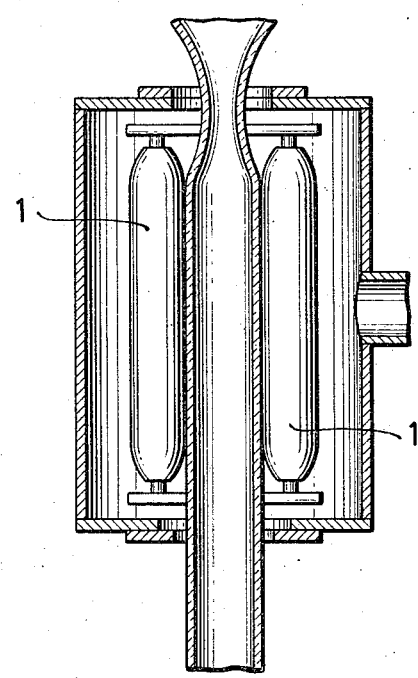
FIG. 2 shows in diagrammatic sectional elevation an arrangement of shaping or forming rolls when a glass tube length enters the region defined by the rolls with a smaller diameter and is expanded by means of reduced atmospheric pressure until the diameter of the tube is defined by the rolls.
Figure 3:
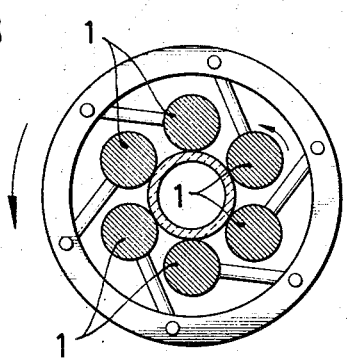
FIG. 3 shows the arrangements according to FIG. 1 and FIG. 2 as a horizontal cross-section.
Figure 4:
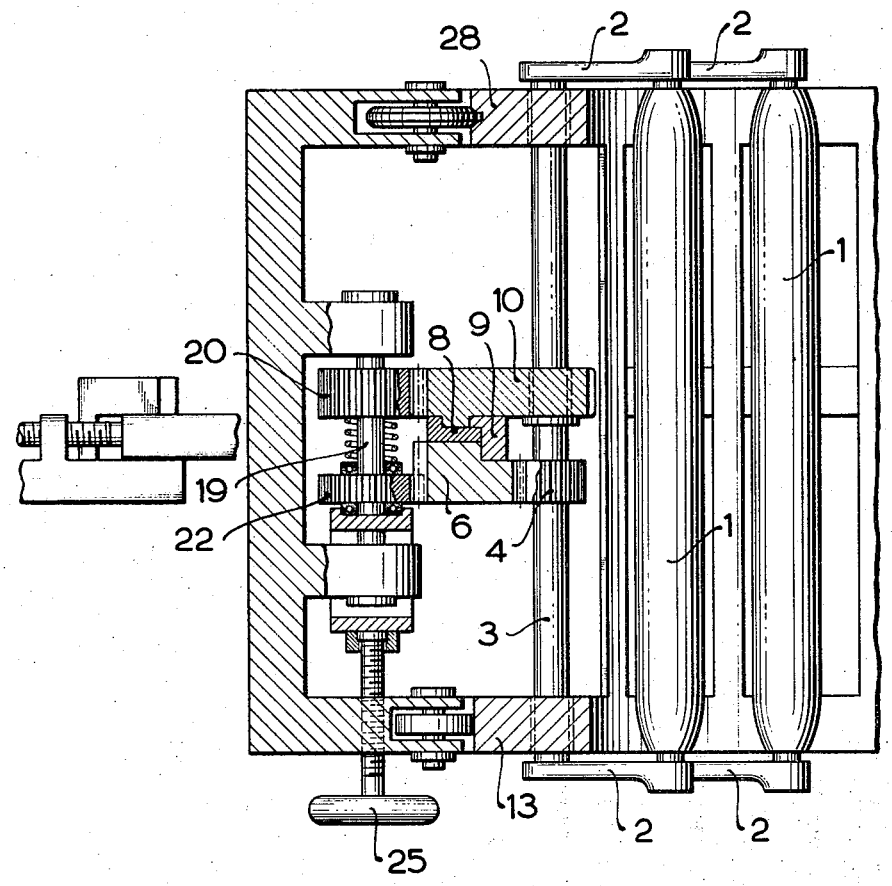
FIG. 4 shows in diagrammatic sectional elevation one possible constructional form of a shaping or forming arrangement having driving means.
Figure 5:
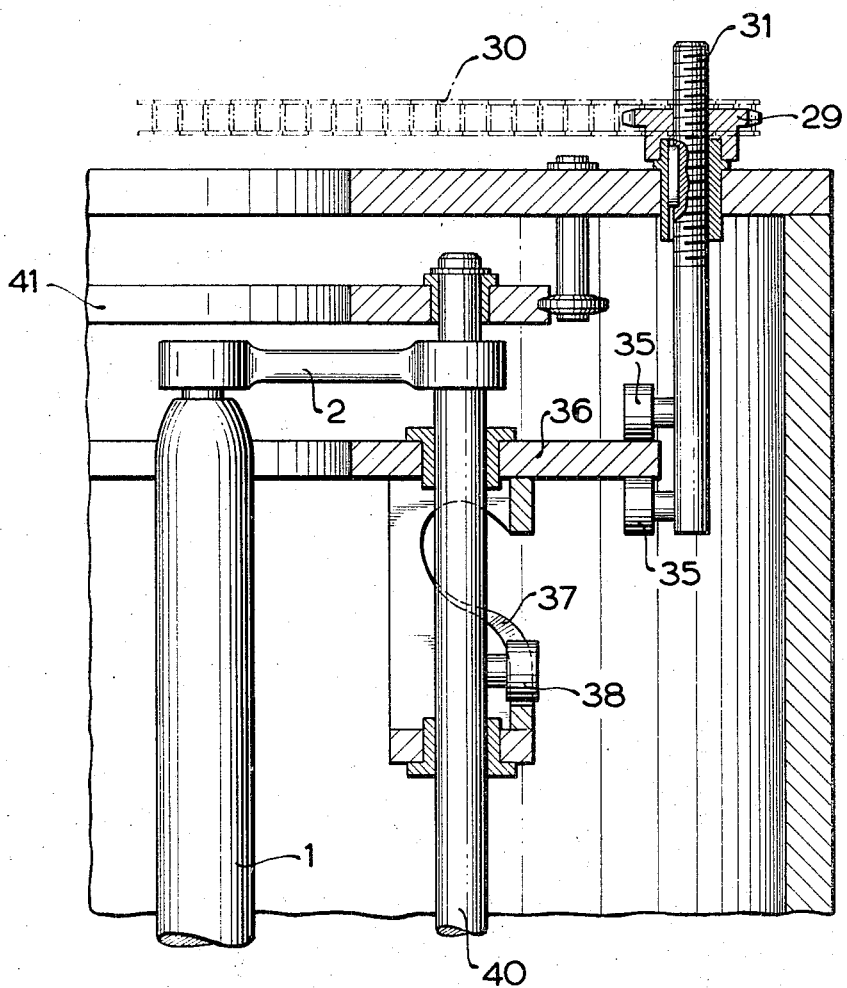

FIG. 5 shows in diagrammatic sectional elevation parts of another possible construction of a shaping or forming arrangement. Shaping or forming rolls 1 are connected by means of levers 2 to rods 3. Rods 3 are mounted at the top and bottom ends in rings 28 and 13 (FIG. 4) and in the middle in bearing part 10; keyed to the rod 3 is a pinion 4. The pinion 4 meshes with the internal teeth of the toothed ring 6 and the latter meshes by its external teeth with those of pinion 22, while the part 10 meshes with its external teeth in the pinion 20. The parts 10 and 6 are so interconnected that they can be rotated relatively to one another by means of intermediate elements 8 and 9 which slide one upon the other. If a setting spindle 25 is rotated and the pinion 22 is raised or lowered through an intermediate element, then the pinion 22, because of its threaded connection with shaft 19, is turned relative to the pinion 20, which is keyed on the shaft 19, and thus also turns the part 6 relative to the part 10. As a result, the pinion 4 rolls on the internal teeth of the part 6, the rod 3 is turned and, through the lever 2, swings the roll 1 inwardly or outwardly. Since all rolls 1 are mounted in the manner as described, they also participate in this movement. In this way, the required change in diameter of the circle circumscribed by the rolls 1 is carried out.

Another constructional form is shown in FIG. 5. By means of a sprocket 29, which is connected through a screwthread to spindle 31, a pair of rollers 35 is moved upwardly or downwardly and carried therewith plate 36 which rolls therebetween. Connected fast to plate 36 is a part 37. If the part 37 is moved longitudinally of the rod 40, then the rod 40 is turned via roller 38, which is guided for sliding movement in a recess of part 37, and the shaping or forming roll 1 connected to the shaft 40 through the lever 2 is swivelled.

Arranged at equal spacings on the circumference of the plate 36 are three pairs of rollers 35; they are simultaneously adjusted through the sprockets 29 and chain 30. The rods 40 are mounted top and bottom, the lower plate (not shown) which is similar to the plate 41 being likewise guided by rolls. The parts 36, 41, etc., with all elements fixed thereon, are driven and rotate about the mean axis.

What we claim is:

1. A method of calibrating a length of tube comprising the steps of
   a. drawing a continuous length of tube along its axis,
   b. positioning forming elements around the length of tube with their axes parallel to the axis of the length of tube,
   c. revolving the forming elements together around the axis of the length of tube,
   d. adjusting the forming elements cooperatively, toward or away from the length of tube,
   e. arranging the forming elements to define the required outer diameter of the length of tube.

2. A method, according to claim 1, wherein a continuous length of glass tube is drawn.

3. A method, according to claim 1, comprising the further step of allowing the forming elements to rotate about their respective axes as the length is being drawn.

4. A method, according to claim 1, comprising the further steps of
   a. receiving a length of tube having a diameter smaller than the intended outer diameter and
   b. expanding the diameter of the length of tube by reducing the atmospheric pressure outside the length of tube.

5. A method, according to claim 1, wherein the length of tube is drawn through at least three forming elements.

6. A method, according to claim 1, comprising the further step of forming a gas cushion between the forming elements and the outer surface of the length of tube.

7. A method of calibrating the outer diameter of a length of tube comprising the steps of:
   1. forming a tunnel region circumscribed by a plurality of parallel, elongated rolls, the tunnel region having an axis parallel to the axes of the rolls,
   2. swivelling the rolls toward or away from each other thereby diminishing or enlarging the opening of the formed tunnel region,
   3. drawing the lengths of tube through the tunnel region after the opening of the tunnel region has been formed in accordance with the diameter sought for the drawn length of tube, and
   4. revolving the rolls simultaneously about the drawn length of tube, thereby calibrating the outer diameter of the length of tube as it is being drawn.

8. An apparatus for calibrating the outer diameter of a continuously drawn length of tube comprising:
   1. a plurality of substantially parallel, elongated rolls,
   2. a tunnel region, through which the length of tube is drawn and formed, circumscribed by the rolls, where the region has an axis parallel to the axes of the rolls,
   3. a swivelling means for bringing the rolls closer together or further apart, thereby diminishing or enlarging the diameter of the tunnel region through which the lengths of tube are drawn and formed, and
   4. a means for revolving the rolls simultaneously about the drawn length of tube, thereby calibrating the length of tube to the desired outer diameter.

9. An apparatus, as in claim 8, further comprising:
   1. a plurality of identical arrangements, each of which comprises:
      a. an elongated roll,
      b. a rod parallel to the roll,
      c. a pair of parallel levers, each lever having an engaging end and a holding end, the engaging ends of the levers engaging the roll and the holding ends affixing the lever to the rod, thus attaching the roll to the rod,
      d. a pinion coaxially fixed to the rod
      e. a spindle which is rotatable about its axis,
      f. a means for coupling spindle to the pinion, in order to impart the rotation of the spindle into rotation of the pinion and the rod to which the pinion is affixed, thereby enlarging or diminishing the diameter of the tunnel region
   2. a frame into which the rods are affixed parallel in a circular pattern having an axis parallel to that of the tunnel region
   3. a means for coupling the identical arrangements together, and
   4. a means for rotating the frame about its axis, thereby revolving the rods and the rolls which are attached thereto about the length of tube as it is being drawn.

10. An apparatus for calibrating the outer diameter of lengths of tube comprising:
   1. a plurality of identical arrangements, each of which comprises:
      a. an elongated roll,
      b. a rod parallel to the roll,
      c. a pair of levers attaching the roll to the rod,
      d. a cylindrical sleeve, surrounding the rod, having:
         1. a closed, helical cut-out portion spiralling about the sleeve and
         2. sliding members which slidably and rotatably hold the sleeve to the rod,
      e. a roller member, affixed to the rod, the roller member fitting into the cut-out portion of the sleeve;
   2. a means for displacing the sleeve laterally along the rod comprising
      a. a threaded spindle laterally displaceable along an axis parallel to the axis of the rod,
      b. a flat, ring-shaped plate which attaches to and encircles the sleeve and
      c. a roller coupling disposed between the plate and the spindle, said coupling imparting the lateral motion of the spindle to the sleeve through the attached plate d. a means for laterally displacing the spindle 3. a means for coupling the identical arrangements together, thereby providing for the cooperative adjustment of the rolls such that all spindles are similarly displaced causing all sleeves to be similarly displaced thereby causing all rods to be similarly rotated about their axes, and finally causing all rolls to be adjusted with respect to each other to define the required diameter of the length of tube to be drawn, and 4. a frame into which the rods are affixed parallel in a circular pattern having an axis parallel to that of the tunnel region.

5. a means for rotating the frame about its axis, thereby revolving the rods and the rolls which are attached thereto about the length of tube as it is being drawn.

* * * * *